United States Patent [19]

Thompson

[11] Patent Number: 4,971,137
[45] Date of Patent: Nov. 20, 1990

[54] AIR-TO-AIR HEAT EXCHANGER WITH FROST PREVENTING MEANS

[75] Inventor: David A. Thompson, West Chicago, Ill.

[73] Assignee: American Energy Exchange, Inc., West Chicago, Ill.

[21] Appl. No.: 434,806

[22] Filed: Nov. 9, 1989

[51] Int. Cl.$^5$ ............................................. F24H 3/02
[52] U.S. Cl. ...................................... 165/32; 165/40; 165/54; 165/166; 165/921
[58] Field of Search ................... 165/32, 40, 54, 909, 165/166, 167, 921

[56] References Cited

U.S. PATENT DOCUMENTS

| | | | |
|---|---|---|---|
| 2,400,617 | 5/1946 | Wheller | 165/166 |
| 4,653,574 | 3/1987 | Quinlisk et al. | 165/54 |
| 4,862,952 | 9/1989 | Tarasewich et al. | 165/54 |

FOREIGN PATENT DOCUMENTS

| | | | |
|---|---|---|---|
| 470100 | 12/1950 | Canada | 165/54 |
| 2060631 | 6/1971 | Fed. Rep. of Germany | 165/166 |
| 0761791 | 9/1980 | U.S.S.R. | 165/54 |
| 0851082 | 7/1981 | U.S.S.R. | 165/54 |
| 0987317 | 1/1983 | U.S.S.R. | 165/40 |
| 1083033 | 3/1984 | U.S.S.R. | 165/54 |
| 1336448 | 11/1973 | United Kingdom . | |

OTHER PUBLICATIONS

News Letter dated 6/29/89, entitled "Timeclock Defrost Functional Operation", (4 pages), Hoval.
Brochure entitled "Hoval PWT Aluminium Plate Heat Exchangers for Heat Recovery in Ventilation Units", (No date), (46 pages).
Brochure entitled, "Packaged System—Energy Recovery as a Profit Center", American Energy Exchange, Inc., (No date), (4 pages).
Brochure entitled "Aluminium Plate Heat Exchangers", American Energy Exchange, Inc., (4 pages), (No date).

*Primary Examiner*—John Ford
*Attorney, Agent, or Firm*—Flynn, Thiel, Boutell & Tanis

[57] ABSTRACT

A plate-type air-to-air heat exchanger is provided with a control device disposed directly adjacent the corner of the heat exchanger located between the cold air inlet and the warm air outlet. The control device includes a swingable baffle plate positioned adjacent the corner for partially closing off the cold air inlet directly adjacent the corner to deflect the inflowing cold air away from the corner to prevent build up of frost or ice. The baffle is controlled by a motor which in turn is preferably controlled in response to the outside air temperature.

9 Claims, 3 Drawing Sheets

AIR-TO-AIR HEAT EXCHANGER WITH FROST PREVENTING MEANS

FIELD OF THE INVENTION

This invention relates to an air-to-air heat exchanger having flow control means associated with the cold air inlet to prevent or minimize built up of ice or frost on the heat exchanger.

BACKGROUND OF THE INVENTION

In commercial and industrial buildings which utilize significant quantities of incoming external air to ensure that the air within the building is properly cycled, it is conventional to utilize an air-to-air heat exchanger to extract heat from the warm building air which is being discharged so as to effect some preheating of the cold exterior air which is being supplied into the building. Such heat exchanger traditionally employs a boxlike structure having a first pair of opposite sides which define the respective inlet and outlet for the incoming cold air, and having a second pair of sides which respectively define the inlet and outlet for the outgoing warm air. The first and second pairs of sides are generally in transverse or perpendicular relationship to one another. Further, the heat exchanger includes interior dividers, such as a series of parallel plates, which define a first series of channels which extend between the cold air inlet and outlet and permit flow therethrough solely of the incoming cold air, with the dividers or plates also defining a second series of channels which extend between the warm air inlet and outlet and permit flow therethrough of solely the warm air. The first and second series of channels are isolated from one another, but alternately positioned, to permit heat transfer from the warm air to the cold air.

In known air-to-air heat exchangers of the above type, while such heat exchangers function in a desirable manner so long as the outside air temperature does not approach or fall below freezing temperature, nevertheless it has been observed that frost or ice can rapidly build up and either partially or totally seal off the heat exchanger when the outside air temperature is significantly below freezing. Such icing has been observed to occur primarily, and at least initially, at the corner of the heat exchanger defined between the cold air inlet and the warm air outlet. At such corner, the warm air, which may bear a substantial quantity of moisture, can be cooled to below freezing temperature and hence the moisture condenses and freezes up on the heat exchanger plates, thereby closing off some of the channels associated with the warm air. In fact, under severe conditions, it has been observed that the ice will spread across and close off all of the channels associated with and adjacent the warm air outlet.

To avoid or compensate for the above problem, it has been conventional to provide the heat exchanger with some type of arrangement to permit defrosting of the heat exchanger on a controlled or periodic basis. Needless to say, such icing of the heat exchanger presents a formable problem since, even under a partially iced condition, the volume of warm air passing through the heat exchanger decreases so that the capacity and efficiency of the heat exchanger rapidly decreases.

In one known structure which has attempted to compensate for the icing problem, a temperature sensor is located at the corner of the heat exchanger which tends to initially ice up to sense the temperature of the discharged warm air. This temperature sensor is set to sense freezing temperature, namely 32° F. If this temperature is sensed so as to indicate a potential or actual icing problem at this corner of the heat exchanger, then the sensor controls dampers associated with the cold air inlet so that the cold air inlet is effectively closed off, and the cold air is bypassed around the heat exchanger. In this manner, the warm air being supplied to the heat exchanger is effective to deice the heat exchanger and permit the overall temperature thereof to rise, following which the dampers are again adjusted so that the cold air can again be supplied to the cold air inlet. This arrangement, while effective in either deicing or preventing icing of the heat exchanger, is nevertheless undesirable since it results in the heat exchanger efficiency being decreased. Further, this arrangement permits significant volumes of incoming cold air to totally bypass the heat exchanger at irregular intervals and be supplied into the building, and hence this seriously disrupts the uniform temperature of the air within the building.

In another known system which attempts to compensate for this problem, the heat exchanger is controlled by a timer which periodically shuts down the heat exchanger at regular intervals so as to permit defrosting, during which intervals the incoming cold air totally bypasses the heat exchanger. This arrangement, however, possesses the same disadvantages noted above.

In another known system, which has only recently been commercially introduced, an attempt has been made to solve the icing problem by providing a small gate which is mounted at the cold air inlet and which slowly traverses across the inlet so as to periodically close off selected cold air channels for a predetermined period of time. As this gate slowly traverses across the cold inlet, it closes off only a small number of channels at a time, for a selected period of time, whereby the warm air passing through the adjacent warm air channels can defrost the closed-off cold air channels. With this arrangement, however, some of the cold air channels are closed off at all times, and hence the overall capacity and efficiency of the heat exchanger, compared to the total number of flow channels provided, is reduced. Further, this arrangement mounts the gate on a pair of rotatable leads screws, and hence the overall arrangement is mechanically complex and increases the required amount of routine service and maintenance.

Accordingly, it is an object of the present invention to overcome the problem of icing as associated with an air-to-air heat exchanger, and at the same time provide a system which is believed to improve upon and overcome the disadvantages associated with prior known systems as described above.

More specifically, in the improved air-to-air heat exchanger of the present invention, there is provided a flow control arrangement directly adjacent the cold air inlet, which flow control arrangement can be controlled to partially close off, to a varying extent, the cold air inlet in the vicinity of the corner which typically ices up. The control apparatus, which in a preferred embodiment is responsive to outside temperature, can be adjustably positioned relative to the cold air inlet so as to effectively prevent ice build up in the heat exchanger. At the same time, the flow control arrangement is of an extremely simple and noncomplex structure, is economical to manufacture, is simple in operation, and requires little if any maintenance.

In the improvement according to the present invention, the heat exchanger is of a boxlike configuration and includes a first pair of generally parallel opposite sides which respectively define the cold air inlet and discharge, and includes a second pair of generally parallel opposite sides which define the warm air inlet and discharge, the second sides being generally perpendicular with respect to the first sides. A plurality of heat exchanger dividers, preferably parallel plates, extend transversely across the heat exchanger and define a series of first channels for permitting solely flow of cold between the respective inlet and discharge, and a series of second channels which permit solely flow of warm air between the respective inlet and discharge, with the first and second channels being isolated from one another and alternately interposed to permit efficient heat transfer from the warm air through the heat exchanger plates to the cold air. A flow control device is disposed adjacent the cold air inlet in the vicinity of the corner between the cold air inlet and the warm air discharge to prevent ice build up at this corner of the heat exchanger. The flow control device includes a swingable platelike baffle which is positioned adjacent the corner when in a fully open position, and which is swingable away from the corner so as to partially close off a selected area of the cold air inlet directly adjacent the corner. This baffle, when in a partially closed position, deflects the inflowing cold air at the cold air inlet away from the aforementioned corner to prevent or significantly minimize any tendency for ice to build up at this corner. The baffle is controlled by a suitable drive motor, which in turn is controlled by an appropriate control or sensor so as to maximize system performance. The sensor preferably responds to and controls in accordance with outside air temperature. Even when the baffle is in a partially closed position so that the incoming cold air is diverted into only a portion of the cross sectional area of the cold air inlet, nevertheless the first channels as defined between adjacent heat exchanger plates are fully opened across the complete cross section thereof so that the incoming cold air, after passing downstream of the baffle plate, can expand outwardly so as to completely occupy the complete cross section of the first channels, which expansion occurs as the cold air flows longitudinally through the channels so that the volume of col air in the vicinity of the aforementioned corner is minimized, and build up of ice can be prevented or minimized. While the heat exchanger experiences a small decrease in air output and overall efficiency, nevertheless the heat exchanger is able to function in a continuous and reliable manner without experiencing drastic changes in efficiency and flow such as is experienced when bypassing of cold air is required for defrosting purposes.

Other objects and purposes of the present invention will be apparent to persons familiar with systems of this general type upon reading the following specification and inspecting the accompanying drawings.

Figure 1:
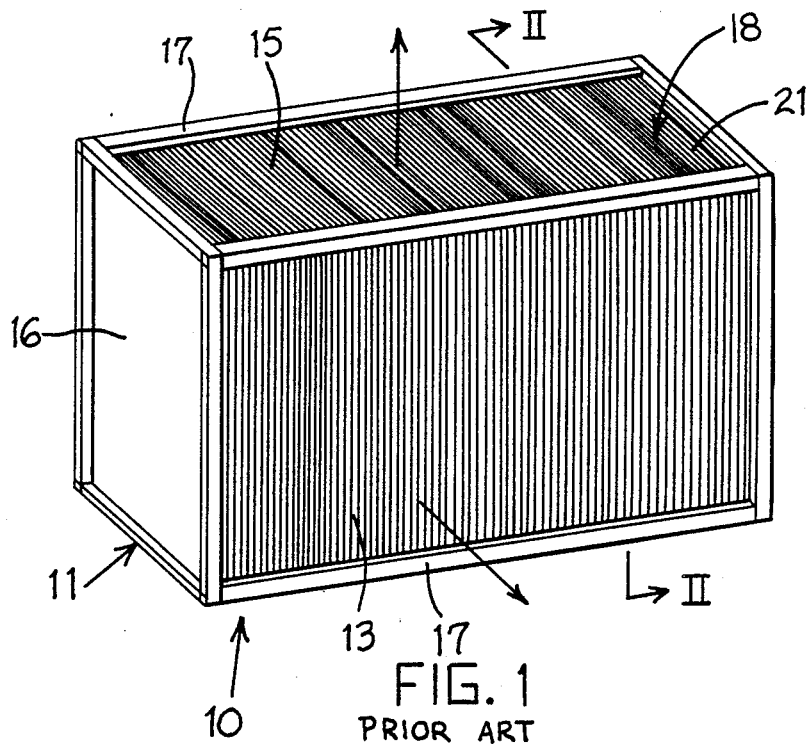
FIG. 1 is a perspective view of a known air-to-air heat exchanger.
Figure 2:
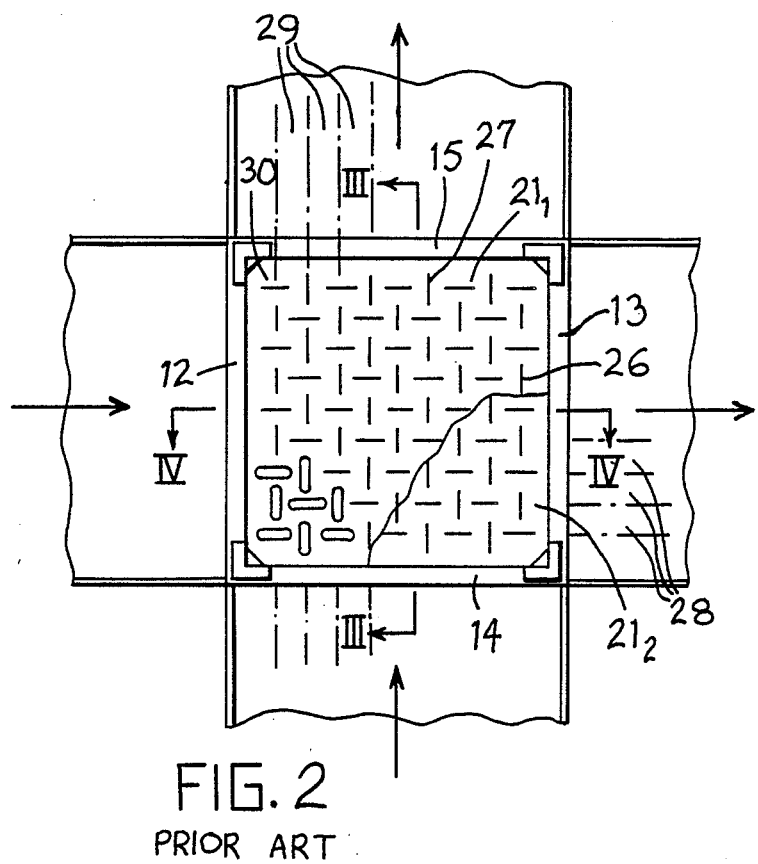
FIG. 2 is a cross sectional view taken substantially along line II—II in FIG. 1.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the heat exchanger and designated parts thereof. The word "inward" will also be used to refer to the flow direction of the incoming cold air relative to the building, and the word "outward" will be used with reference to the flow of outgoing warm air relative to the building. Said terminology will include the words specifically mentioned, derivatives thereof, and words of similar import.

DETAILED DESCRIPTION

Referring to FIGS. 1-4, there is illustrated a known air-to-air heat exchanger 10, such unit being sold under the brand name "Hoval". This heat exchanger 10 is of a boxlike construction and includes a boxlike housing 11 having a first pair of opposed and substantially parallel sides in which are defined a cold air inlet 12 and a cold air discharge 13. The housing also has a further pair of opposed and substantially parallel sides in which are defined a warm air inlet 14 and a warm air outlet 15, the warm air inlet-discharge 14-15 being disposed in planes which are substantially perpendicular to the planes of the cold air inlet-discharge 12-13. The housing includes substantially solid end walls 16 which close off the ends of the heat exchanger, and these end walls 16 are rigidly joined together by corner or edge elements 17 which extend perpendicularly therebetween and which effect separation between the adjacent inlets and discharges.

The heat exchanger defines therein a core 18, the latter defining a first series of cold air flow channels which provide communication solely between the inlet 12 and discharge 13, with the cold air channels being alternated between warm air channels which extend between and provide communication solely with the warm air inlet 14 and discharge 15.

The core 18, in the preferred embodiment, is defined by a plurality of heat exchanger plates 21, which plates are designated $21_1$, $21_2$, $21_3$ . . . in the drawings for convenience in description. These heat exchanger plates 21 are preferably constructed of thin sheetlike aluminum, and the plates are disposed so that the planes thereof are oriented in substantially parallel relationship to the housing end walls 16, with the plurality of heat exchanger plates 21 being disposed in parallel but slightly spaced relationship in the lengthwise direction of the heat exchanger so as to define airflow channels between adjacent plates 21.

Figure 3:
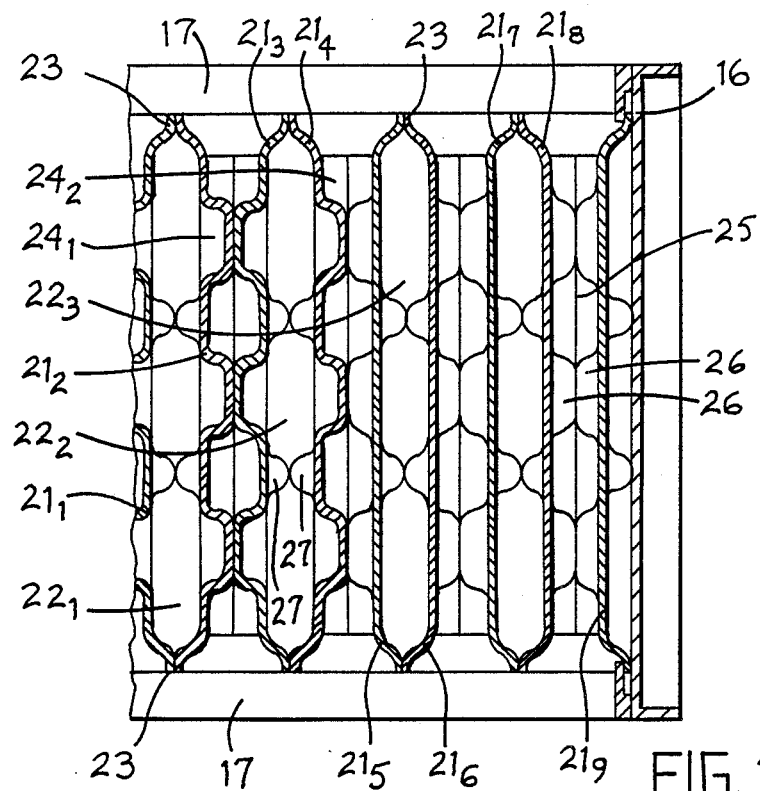
FIGS. 3 and 4 are enlarged, fragmentary cross sectional views taken substantially along lines III—III and IV—IV, respectively, in FIG. 2.
Figure 4:
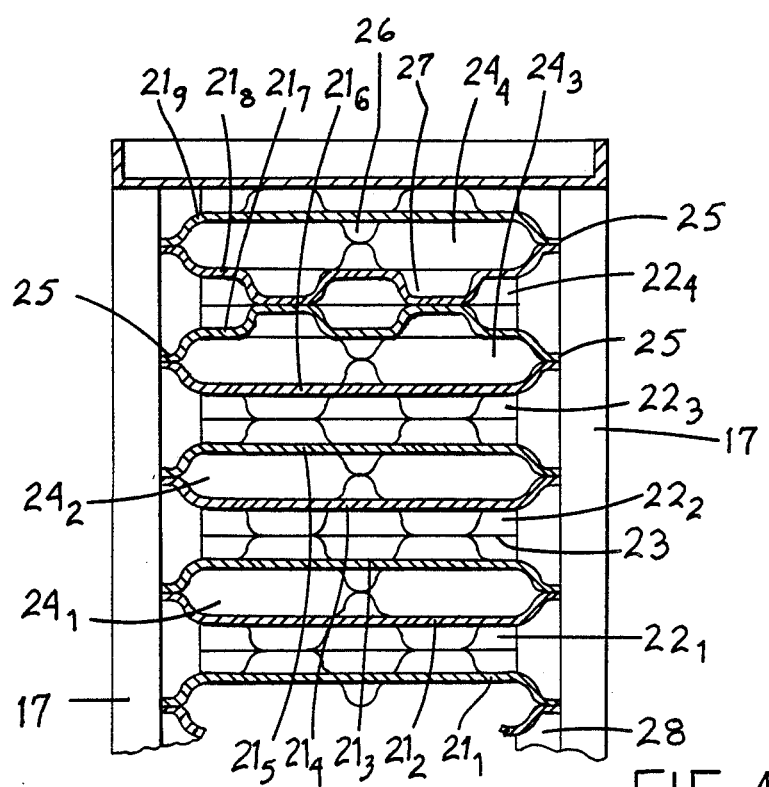

As illustrated by FIGS. 3 and 4, the adjacent pair of plates $21_1$ and $21_2$ define a flow channel $22_1$ therebetween which provides open communication between the cold air inlet 12 and the cold air discharge 13. This channel $22_1$ is, however, isolated from the warm air inlet 14 and discharge 15 due to the edges of the plates $21_1$ and $21_2$ as disposed adjacent the warm air inlet 14 and discharge 15 being suitably sealed together, such as by a crimp or fold 23.

In similar fashion, the next two plates $21_3$ and $21_4$ defining the next adjacent pair also define an air flow channel $22_2$ therebetween which provides communication between the cold air inlet 12 and discharge 13, with the other edges of these plates being crimped or sealed at 23 so as to prevent the channel $22_2$ from communicating with the warm air inlet 14 and discharge 15.

Each of the remaining adjacent pairs of plates are similarly formed so as to define further channels 22 which provide flow solely between the cold air inlet 12 and discharge 13.

On the other hand, the adjacent alternate pairs of heat exchanger plates such as plates $21_2$ and $21_3$ define a flow channel $24_1$ therebetween which provides communication solely between the warm air inlet 14 and discharge 15. This channel $24_1$ is isolated from the cold air inlet 12 and discharge 13, and for this purpose the edges of the pair of plates $21_2$ and $21_3$ are suitably crimped or folded as indicated at 25 so as to sealingly close the edges and hence prevent the channel $24_1$ from communicating with the cold air flow.

In similar fashion, the next alternate pair of plates $21_4$ and $21_5$ define a further warm air channel $24_2$ therebetween which also communicates solely between the warm air inlet 14 and discharge 15, with the other edges of these plates being suitably sealed together by a crimp or fold 25 so as to isolate the channel $24_2$ from the cold air flow.

In the above fashion, the adjacent pairs of heat transfer plates 21 define a series of flow channels 22 which provide communication solely with the cold air inlet 12 and discharge 13. In similar fashion, the alternate adjacent pairs of plates define a series of flow channels 24 which provide communication solely between the warm air inlet 14 and discharge 15, with these series of flow channels 22 and 24 being alternately interleaved or positioned longitudinally throughout the lengthwise extent of the heat exchanger so as to permit heat transfer from the warm air flowing through channels 24 through the intermediate heat transfer plates 21 into the cold air flowing through the channels 22.

The corners of the heat exchanger plates 21, in the vicinity of the housing corner elements 17, are normally stationarily and sealingly seated within an elongate seal member, such as a plastic resin. To increase the turbulence of the air moving through the channels and hence increase the heat transfer efficiency, and at the same time provide increased strength and rigidity, each heat transfer plate 21 has a plurality of elongate ridges 26 formed therein. These ridges project sidewardly solely in one direction from the plane of the plate and are disposed so that several such elongate ridges 26 are oriented with the elongate direction thereon within a single row, with several such rows being disposed in sidewardly spaced but parallel relationship throughout the plate. The ridges 26 within each row are spaced from one other.

In similar fashion, a further series of elongate ridges 27 is also formed in each plate, except that the ridges 27 project sidewardly from the plane of the plate 21 solely in an opposite sideward direction from the other ridges 26. These ridges 27 are also disposed so that several such ridges are disposed in spaced relationship within a single row which extends along the lengthwise extent of the respective ridges 27, with several such rows being disposed in parallel and sidewardly spaced relationship across the plate. The elongated extent of these ridges 27, however, extends perpendicularly with respect to the elongated extent of the other ridges 26.

The ridges 26 and 27 also function to support adjacent plates 21 with respect to one another. For this purpose, adjacent plates 21 are oriented so that the ridges 26 on one adjacent pair of plates project toward one other so that the crest of the ridges substantially abut and hence create a proper positional relationship between adjacent plates, substantially as illustrated by the plates $21_2$ and $21_3$ in FIG. 3. On the other hand, the next alternate adjacent pair of plates, such as plates $21_3$ and $21_4$ are oriented so that the other ridges 27 are disposed in directly opposed and contacting relationship so as to maintain the proper positional spacing between the next plate pair.

With the core constructed from plates having ridges (or dimples) thereon as described above, the ridges 27 are hence disposed so as to project into the channels 22, and the elongate direction of the ridges 27 extends generally parallel with the flow direction through the respective channels 22. These ridges 27 hence tend to create a plurality of subchannels 28 which extend parallel to one between the cold air inlet 12 and discharge 13. These subchannels 28, however, are not totally isolated from one another, but rather do permit flow communication therebetween inasmuch as the ridges 27 as disposed within each row are longitudinally spaced from one other.

In similar fashion, the other ridges 26 project into the channels 24 and effectively divide the latter into a plurality of subchannels 29 which extend between the warm air inlet and discharge 15. These subchannels 29, however, also permit sideward communication therebetween inasmuch as the ridges 26 within the individual rows are longitudinally spaced from one another.

In operation, the cold air from the outside is supplied through a duct to the cold air inlet 12, whereupon the air then flows through the series of channels 22 and is discharged outwardly through the outlet 13 so as to be supplied to the building or to a further heating system within the building. At the same time, the warm air being discharged from the building is supplied to the inlet 14 and then feed through the heat transfer channels 24 so as to be discharged out the outlet 15 and then discharged outside the building. During passage of the warm air through the channels 24, some of the heat energy of the warm air is transmitted through the intermediate heat transfer plates 21 to the cold air flowing through the channels 22. In this fashion, the incoming cold air is warmed as it flows through the channels 22, and conversely the outgoing warm air is cooled as it flows through the channels 24, thereby permitting retention of some of the heat energy within the building.

The system illustrated and described above is conventional and well known.

When effecting heat transfer with a heat exchanger having a configuration similar to that noted above, either when using plates or other heat exchanger elements such as separate flow tubes, it has been observed that there is a tendency for the heat exchanger to ice up at least initially in the vicinity of the corner 30 when the warm air contains significant moisture and the incoming cold air is at or below the freezing of temperature of 32° F. The icing tends to occur initially at this corner 30, which corner is located directly between the cold air inlet 12 and warm air discharge 15, since the cold air as supplied to the inlet 12 is at its lowest or coldest temperature, and the temperature of the incoming cold air gradually increases as the air moves through (from left to right in FIG. 2) the channels 22. Similarly, the warm air flowing through channels 24 is at its minimum or lowest temperature when reaching the discharge 15.

Hence, the minimum temperature differential between the incoming cold air at inlet 12 and the discharged warm air at discharge 15 occurs in the vicinity of the corner 30, and hence condensation and freezing of moisture generally first occurs at this corner.

Figure 5:
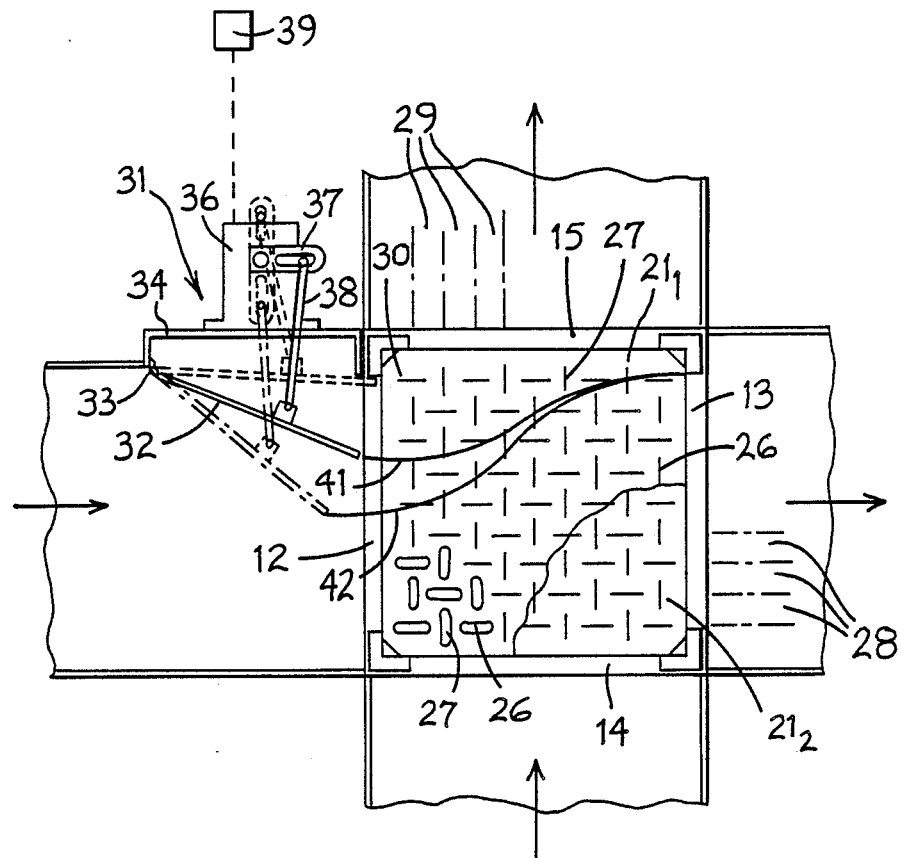
FIG. 5 is a view similar to FIG. 2 but illustrating the improved air-to-air heat exchanger according to the present invention.

To prevent or minimize the tendency for frost or ice to develop at the corner 30, the heat exchanger 10 of the present invention, as illustrated by FIG. 5, incorporates a flow control device 31 for controlling the sizes of the cold inlet 12 and hence controlling the flow of incoming cold air in the vicinity of the corner 30.

This flow control 31 includes a baffle plate 32 which has one edge thereof connected by a hinge 33 to a support plate 34, the latter being stationarily fixed adjacent the cold air inlet 12 in the vicinity of the corner 30. This hinge 33 extends generally parallel with the lengthwise extent of the cold air inlet 12 and is spaced outwardly (in the upstream direction) therefrom so as to be substantially aligned with the adjacent longitudinally extending edge of the opening 12. The other edge of the baffle plate 32 is a free edge and, when the baffle plate is in the fully opened position as illustrated by dotted lines, this free edge is positioned directly adjacent the longitudinal edge of the inlet 12 which is disposed at the corner 30. With the baffle plate 32 in this fully opened position, the baffle plate 32 does not interfere with the flow of cold air into the inlet 12, and in fact the baffle plate is oriented approximately parallel with the incoming air as it flows into the inlet 12.

The baffle plate 32 is swingably movable into a position for closing off a part of the inlet 12 in the vicinity of the corner 30, such partial closing position being indicated both by the solid line position and the dash-dot line position shown in FIG. 5. The baffle plate 32 is movable into these positions, or into any selected intermediate position, by an actuator or drive device 36, such as a small motor, which in turn is drivingly coupled to the baffle plate through an intermediate linkage which includes a drive crank 37 and an intermediate connecting link 38. The drive motor 36 is preferably actuated and controlled from a sensor 39 which senses a predetermined condition and effects opening or closing movement of the baffle 32 to position the baffle at an optimum location. The sensor 39 preferably senses outside air temperature so as to control opening and closing of the baffle as a condition of the air temperature supplied to the cold air inlet 12.

In operation, when the outside air temperature is above freezing, the sensor 39 will maintain the baffle 32 in the fully opened position (dotted position) since, under this temperature condition, ice or frost will not be formed at the critical corner 30. Hence, the incoming cold air is supplied to the entirety of the cold air inlet 12 and maximum capacity and heat transfer efficiency can be achieved by the heat exchanger 10.

However, if the outside air temperature decreases to freezing or slightly below freezing, then the sensor 39 will activate the drive motor 36 and swing the baffle 32 downwardly a predetermined extent so as to partially close off the inlet 12 in the vicinity of the corner 30, such as for example as illustrated by the solid line position in FIG. 5. In this position, the inflowing cold air supplied to inlet 12 is maintained in spaced relation from the critical corner 30, although when the air passes beyond the free edge of the baffle 32 and through the opening 12, the cold air will tend to expand laterally and fill the entire cross section of the channels 22, substantially as indicated by the flow line 41, such lateral expansion being permitted by the spaces defined between the longitudinally aligned ridges 27. However, since the warm air subchannels 29 disposed directly adjacent the cold air inlet 12 are exposed to the cold air over a much shorter length of travel, there is less tendency for the warm air to be cooled to below the freezing point, and hence creation of frost or ice can be substantially eliminated. If the outside air temperature drops significantly below freezing, then the sensor 39 will cause the baffle 32 to swing into a more fully open position, such as indicated by dash/dot lines in FIG. 5, whereby a greater part of the inlet 12 in the vicinity of the corner 30 is closed off. In this latter position, the inflowing cold air hence enters through an even smaller part of the inlet 12, although the air after entering the channels 22 will again expand laterally across the full width of the channels substantially as illustrated by the flow path 42. Hence, due to the greater temperature differential between the very cold inflowing cold air at inlet 12, and the temperature of the warm air supplied to the inlet 14, the warm air within the subchannels 29 directly adjacent the inlet 12 are exposed to this cold air through an even shorter extent of travel, and in this manner the drop in temperature of the warm air can be controlled so as to prevent it from reaching the freezing point.

With the improved arrangement of this invention, and with the baffle 32 in a partially closed (such as about a 25 percent closed) position, the temperature of the incoming cold air as it exits the discharge 13 will be a few degrees warmer than would be the case if the baffle was fully opened, although the volume of air exiting the discharge 13 will be slightly smaller than the volume exiting the discharge if the baffle is fully opened. Hence, while the supply air efficiency increases, nevertheless there is a slight decrease in the efficiency of the heat exchanger as a whole. This slight decrease in heat exchanger efficiency, however, is not detrimental to the desired performance and in fact is significantly outweighed by the operational characteristics of the heat exchanger. More specifically, with this flow control device 31 and its ability to prevent build up of frost or ice, the heat exchanger can remain in continuous operation so as to maintain a fairly constant flow of incoming cold air therethrough with said cold air being continuously warmed to a fairly uniform degree. This continuous flow and warming of the incoming cold air is highly advantageous, and in particular represents a significant improvement over prior systems which require either a bypassing of the cold air or a shut down of the heat exchanger for selected periods of time so as to permit defrosting. Such bypassing or shut down is not required with the improved heat exchanger of this invention.

While controlling the control device 31 based on a sensor 39 which responds to outside temperature is preferred, nevertheless it will be appreciated that the sensor 39 for controlling the device 31 could obviously be responsive to any other desired operational condition.

With the control device 31 and specifically with the configuration and orientation of the baffle 32 when in either the open or partially closed position, such baffle 32 exerts minimum disruption or influence on the incoming flow of cold air since the baffle, when in a closed position, gradually converges and restricts the cross section area of the incoming flow so as to minimize the flow resistance and hence the pressure drop created thereby.

While the heat exchanger of the present invention preferably uses heat exchanger plates therein of the type described above, it will be appreciated that other types of heat exchanger plates or dividers could also be utilized if desired, although for optimum performance said plates should permit lateral communication throughout the width of the cold air flow channels 22 so as to permit lateral expansion in the manner indicated by the flow curves 41 and 42.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an air-to-air heat exchanger including a housing having a pair of generally parallel opposite sides which respectively define therein a cold air inlet and a cold air outlet, said housing having a further pair of generally parallel and opposite sides which respectively define therein a warm air inlet and a warm air outlet, the cold air inlet and outlet being disposed in planes which extend transversely with respect to the planes of the warm inlet and outlet, and a core structure disposed within said housing and defining a first series of cold air flow channels which provide flow communication between the cold air inlet and outlet, said core structure defining a second series of channels which provide flow communication solely between the warm air inlet and outlet, said first and second channels being positioned in alternating relationship to one another in a direction which extends transversely with respect to the direction of flow of air through said first and second channels, said core structure including a plurality of heat transfer divider elements disposed between said first and second channels for permitting transfer of heat therethrough from the warm air flowing through said second channels into the cold air flowing through said first channels, said heat exchanger defining thereon a corner which extends transversely relative to said channels and is disposed directly between an adjacent transversely extending edge of said cold air inlet and an adjacent transversely extending edge of said warm air outlet, the improvement comprising flow control means disposed in the vicinity of said corner and cooperating solely with said cold air inlet for selectively closing off a part of said cold air inlet as disposed directly adjacent said corner in response to the incoming cold air supplied to said cold inlet being at a temperature approximately equal to or below the freezing temperature of water, said flow control means including a baffle plate which is supported along one edge thereof by means of a hinge which extends generally parallel with the transverse edge of said cold air inlet and is spaced a selected distance outwardly therefrom in the upstream flow direction of the incoming cold air, said baffle plate having a free edge which extends generally parallel with the hinge axis and is disposed closely adjacent the transverse edge of said cold air inlet when the baffle plate is in an open position so that said cold air inlet is totally open tot he incoming cold air, and a drive device connected to said baffle plate for swinging same about said hinge axis into a partially closed position wherein the free edge of the baffle plate is displaced transversely away from said transverse edge in a direction toward the opposite transverse edge of the cold air inlet to partially close off the cold air inlet in the vicinity of said corner and deflect the incoming cold air away from said corner.

2. A heat exchanger according to claim 1, including a sensor for sensing the temperature of the outside air and controlling activation of said drive device.

3. A heat exchanger according to claim 1, wherein said heat transfer dividers elements comprise a plurality of heat exchanger plates which are disposed in generally parallel and sidewardly spaced relationship so that the planes of individual said plates extend generally perpendicularly with respect to said inlets and outlets, and said first channels as defined between adjacent heat exchanger plates being open in the transverse cross sectional dimension thereof so as to permit cold air as supplied into said first channels to laterally expand sidewardly throughout the full extent of the first channels at a location downstream of the cold air inlet when the latter is partially closed by the baffle plate.

4. A heat exchanger according to claim 3, including a sensor for sensing the temperature of the outside air and controlling activation of said drive device.

5. In a plate-type gas-to-gas heat exchanger for use in a cold environment for exchanging heat energy between a relatively warm gas and a relatively cold gas, said heat exchanger having a core structure having a plurality of generally parallel and sidewardly spaced heat exchanger plates which define flow channels therebetween, the alternating ones of said flow channels permitting flow of solely cold gas therethrough between a first inlet opening and a first outlet opening, and the remaining ones of said flow channels as disposed between said one flow channels permitting flow therethrough solely of said warm gas between a second inlet opening and a second outlet opening, said second inlet and outlet openings being isolated from and in nonflow communication with said first inlet and outlet openings, the improvement comprising a baffle plate positioned closely adjacent and extending longitudinally along one edge of said first inlet opening for controlling the extent to which said first inlet opening is uncovered for permitting ingress of inflowing cold gas, said one edge of said first inlet opening being disposed closely adjacent and generally parallel to an edge of said second outlet opening, said baffle plate being mounted for swinging movement between an open position wherein said first inlet opening is totally uncovered and a second position wherein said baffle plate extends only partway across said first inlet opening in the vicinity of said one edge for deflecting the incoming cold gas away from said one edge, and said baffle plate when in said second position causing blocking of a portion of said first inlet opening as defined between said one edge and a free edge of said baffle plate to prevent cold gas flow through said portion.

6. A heat exchanger according to claim 5, wherein said baffle plate is disposed with a hinge axis which extends generally parallel with but is spaced outwardly away from said one edge, said baffle plate when in an open position extending from said hinge generally along the incoming flow direction of the cold gas so as to terminate in said free edge which is disposed closely adjacent said one edge, and an actuator for swinging said baffle plate away about said hinge so that the free edge thereof moves away from said one edge to partially close off said first inlet opening.

7. In a plate-type gas-to-gas heat exchanger for use in a cold environment for exchanging heat energy between a relatively warm gas and a relatively cold gas, said heat exchanger having a core structure having a plurality of generally parallel and sidewardly spaced heat exchanger plates which define flow channels therebetween, the alternating ones of said flow channels permitting flow of solely cold gas therethrough between a first inlet opening and a first outlet opening, and the remaining ones of said flow channels as disposed between said one flow channels permitting flow therethrough solely of said warm gas between a second inlet opening and a second outlet opening, said second inlet and outlet openings being isolated from and in nonflow communication with said first inlet and outlet openings, the improvement comprising a baffle plate positioned closely adjacent and extending longitudinally along one edge of said first inlet opening for controlling the extent to which said first inlet opening is uncovered for permitting ingress of inflowing cold gas, said one edge of said first inlet opening being disposed closely adjacent and generally parallel to an edge of said second outlet opening, said baffle plate being mounted for swinging movement between an open position wherein said first inlet opening is totally uncovered and a second position wherein said baffle plate extends only partway across said first inlet opening in the vicinity of said one edge for deflecting the incoming cold gas away from said one edge, said baffle plate being disposed with a hinge axis which extends generally parallel with but is spaced outwardly away from said one edge, said baffle plate when in an open position extending from said hinge generally along the incoming flow direction of the cold gas so as to terminate in a free edge which is disposed closely adjacent said one edge, drive means coupled to said baffle for effecting swinging movement thereof between open and partially closed positions, said drive means causing swinging of said baffle plate about said hinge so that the free edge thereof can move away from said one edge to partially close off said first inlet opening, and control means responsive to the temperature of outside air for controlling actuation of said drive means.

8. In an air-to-air heat exchanger including a housing having a pair of generally parallel opposite sides which respectively define therein a cold air inlet and a cold air outlet, said housing having a further pair of generally parallel and opposite sides which respectively define therein a warm air inlet and a warm air outlet, the cold air inlet and outlet being disposed in planes which extend transversely with respect to the planes of the warm inlet and outlet, and a core structure disposed within said housing and defining a first series of cold air flow channels which provide flow communication between the cold air inlet and outlet, said core structure defining a second series of channels which provide flow communication solely between the warm air inlet and outlet, said first and second channels being positioned in alternating relationship to one another in a direction which extends transversely with respect to the direction of flow of air through said first and second channels, said core structure including a plurality of heat transfer divider elements disposed between said first and second channels for permitting transfer of heat therethrough from the warm air flowing through said second channels into the cold air flowing through said first channels, said heat exchanger defining thereon a corner which extends transversely relative to said channels and is disposed directly between an adjacent transversely extending edge of said cold air inlet and an adjacent transversely extending edge of said warm air outlet, the improvement comprising flow control means disposed in the vicinity of said corner and cooperating solely with said cold air inlet for selectively closing off a part of said cold air inlet as disposed directly adjacent said corner in response to the temperature of the incoming cold air supplied to said cold inlet to prevent freezing adjacent said corner, said flow control means including guide means projecting upstream away from said cold air inlet inserted for positively and smoothly guiding the incoming cold air along a predetermined flow path which is inclined away from said corner and directs said incoming cold air into said cold air inlet at a location spaced from said corner.

9. A heat exchanger according to claim 8, wherein said guide means comprises an air-deflector plate which is positioned longitudinally along one side of a cold air supply passage directly upstream of said cold air inlet, said deflector plate having a free edge at the downstream end thereof which is positioned directly adjacent said corner when the deflector plate is in a fully open position, and the deflector plate being angularly movable into said cold air supply passage so that the free edge is spaced inwardly of said cold air inlet away from said corner and the deflector angles outwardly from its upstream end into the cold air supply passage in the downstream direction thereof.

* * * * *

UNITED STATES PATENT AND TRADEMARK OFFICE
CERTIFICATE OF CORRECTION

PATENT NO. : 4,971,137

DATED : November 20, 1990

INVENTOR(S) : David A. THOMPSON

It is certified that error appears in the above-identified patent and that said Letters Patent is hereby corrected as shown below:

Column 9, line 64; change "tot he" to ---to the---.

Column 10, line 9; change "dividers" to ---divider---.

Column 12, line 30; delete "inserted".

Signed and Sealed this

Twenty-first Day of July, 1992

*Attest:*

DOUGLAS B. COMER

*Attesting Officer*      *Acting Commissioner of Patents and Trademarks*